United States Patent

Seeliger

[15] 3,662,619
[45] May 16, 1972

[54] FAIL-SAFE ROTARY MACHINE

[72] Inventor: Kurt George Seeliger, Schenectady, N.Y.
[73] Assignee: General Electric Company
[22] Filed: Aug. 26, 1970
[21] Appl. No.: 67,181

[52] U.S. Cl..............................74/572, 188/185, 188/189
[51] Int. Cl.........................................F16f 15/30
[58] Field of Search..........................74/572; 188/185, 189

[56] References Cited

UNITED STATES PATENTS

| | | | |
|---|---|---|---|
| 3,485,037 | 12/1969 | Clerk | 74/572 X |
| 3,368,424 | 2/1968 | Clerk | 74/572 |
| 3,490,748 | 1/1970 | Hoffman | 188/185 X |
| 3,296,886 | 1/1967 | Reinhart, Jr. | 74/572 |
| 3,496,799 | 2/1970 | Call | 74/572 |

*Primary Examiner*—William F. O'Dea
*Assistant Examiner*—F. D. Shoemaker
*Attorney*—John J. Kissane, James C. Davis, Jr., Frank L. Neuhauser, Oscar B. Waddell and Joseph B. Forman

[57] ABSTRACT

This invention relates to a fail-safe rotating machine wherein pre-determined failure locations are designed into the rotating element to assure minimum energy release upon failure of the element due to the centrifugal forces acting thereon. In a specific illustrated embodiment, a cylindrical flywheel mounted upon a motor shaft is formed of juxtaposed discs having diverse tensile strengths to inhibit simultaneous failure of the discs. Also disclosed are techniques for assuring predetermined failure locations by fabricating a flywheel of concentric rings having differing thicknesses or by notching the cylindrical surface of a unitary flywheel in a design producing segments of a desired configuration upon failure.

7 Claims, 5 Drawing Figures

FAIL-SAFE ROTARY MACHINE

DISCLOSURE

This invention relates to a fail-safe rotary machine, and in particular, to a rotary machine wherein pre-determined failure locations are designed into rotating elements to assure fracturing of the elements into segments having a geometric configuration producing minimum energy in the fragmented segments. By the utilization of predesigned failure locations, the thickness of a shield required to inhibit penetration therethrough of a fractured segment can be significantly reduced relative to a shield encompassing a rotating element of similar mass without pre-determined failure locations.

Circulating pumps for the primary loop system of nuclear reactors typically are characterized by large flywheels to assure continued circulation of a liquid coolant through the nuclear reactor during a power failure for a sufficient period to permit removal of the rods from the reactor. Large flywheels, however, present design difficulties because of the catastrophic consequences capable of being produced by the disintegration of a rotating component, such as a flywheel, wherein a projectile could be formed capable of piercing the nuclear reactor chamber. To counteract this eventuality, motors designed for use in conjunction with nuclear reactors characteristically possess an abundance of electronic detectors to disable the motor in the event of a runaway condition tending to fracture the rotary parts. However, because an electronic detecting system is subject to failure, it is highly desirable that all rotating structure be made fail-safe, i.e., incapable of producing a flying projectile having sufficient energy to pierce the housing of the structure.

One technique heretofore suggested for achieving such results in nuclear power plants is to imbed all rotary equipment within a concrete casing. The use of concrete casings, however, is not practical because of the periodic service required to maintain the rotating equipment in operative condition. Similarly, metallic shields augmenting the motor housing have been proposed to confine projectiles thrown from the rotating body. However, when the rotating structure is of great mass, e.g., the flywheel of a circulator pump motor often must provide a kinetic energy in excess of $17.5 \times 10^6$ ft./lbs., a metallic shield inhibiting penetration by any possible fragment from the flywheel normally would require a steel sheet having a thickness in excess of 15 inches.

It is therefore an object of this invention to provide a light weight, fail-safe rotating structure.

It is also an object of this invention to provide a rotating structure requiring minimum shielding to inhibit production of externally flying projectiles.

These and other objects of this invention generally are achieved by disposing pre-determined failure locations along the rotating element to inhibit fracturing of the rotating element into segments of most dangerous shape, size and kinetic energy. Thus, a rotary machine formed in accordance with this invention would include a rotatable shaft for providing torque to a pre-determined load, a protruding body fixedly secured to the shaft to continue the application of torque to the load upon interruption of the primary energy source driving the shaft, and pre-determined failure locations incorporated into the protruding body to assure fracturing of the body in a geometric configuration having a reduced energy content relative to geometric configurations capable of being produced by a unitary body of similar design without failure locations. The failure locations and their design can vary dependent upon the physical configuration of the rotating element being made fail-safe, e.g., cylindrical flywheels may be formed of juxtaposed discs having sufficiently different tensile strengths to inhibit simultaneous failure of the discs thereby assuring fracturing of the flywheel into segments having an energy content less than could be produced by an uncontrolled breakage of the flywheel. In general, the segment designed for fracture from a rotating element usually is less than approximately one-third the total weight of the rotating element and possesses a kinetic energy less than one-third the kinetic energy of the rotating element.

While the inventive concept of this invention is defined with particularlity in the appended claims, a more complete understanding of the basic principles of this invention can be obtained from the following detailed description of various specific embodiments taken in association with the accompanying drawings wherein:

Figure 1:
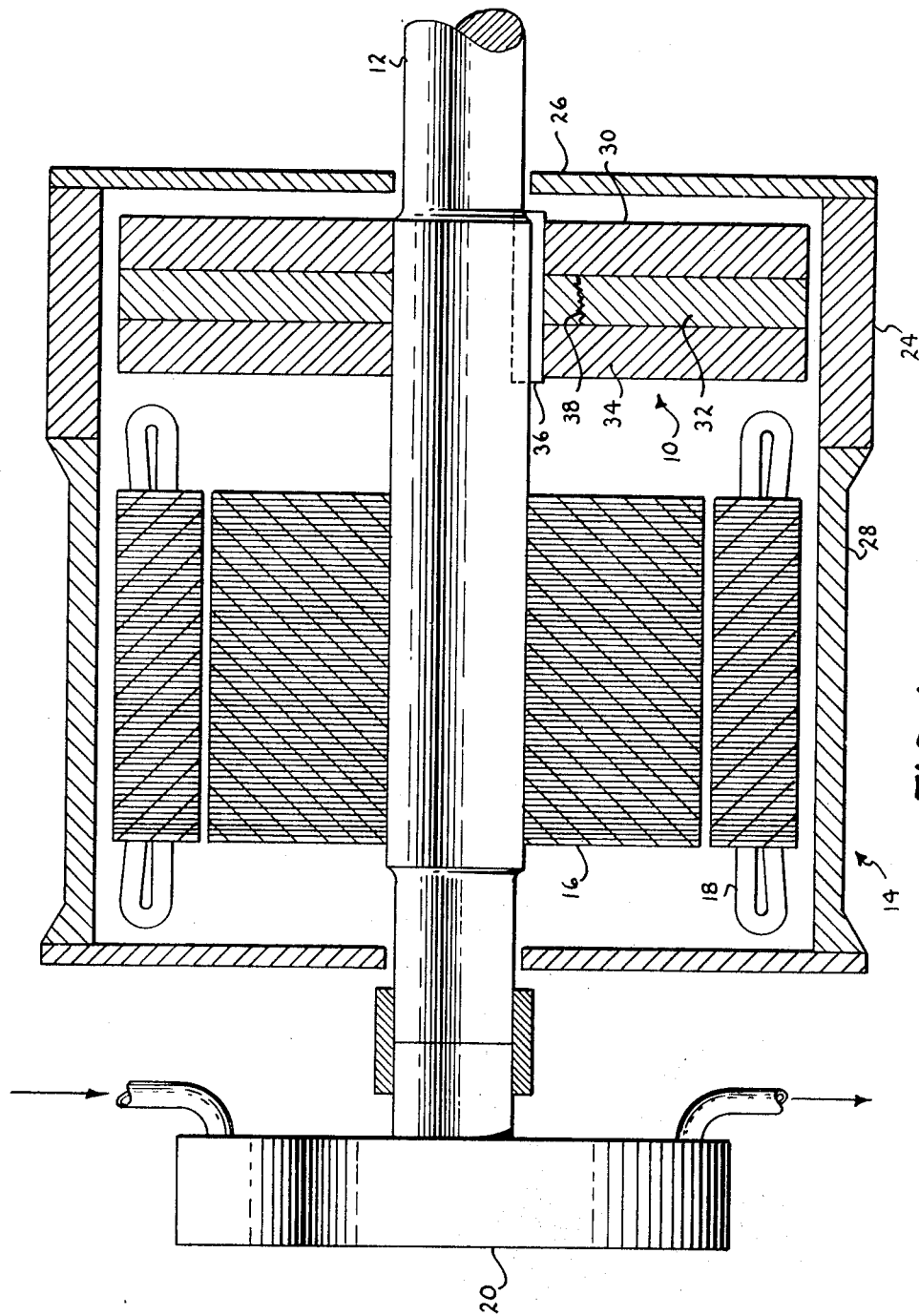
FIG. 1 is a sectional view of a fail-safe rotary structure wherein the flywheel is formed of geometrically identical discs having diverse tensile strengths to inhibit simultaneous fracturing of the entire flywheel.

A novel fail-safe structure in accordance with this invention is illustrated in FIG. 1 by cylindrical flywheel 10 axially mounted about drive shaft 12 of a dynamoelectric machine, typically a pump motor 14 of otherwise conventional design, i.e., having drive shaft 12 fixedly secured to a rotor 16 driven by electromagnetic induction from alternating current energized stator windings 18 to provide a rotational torque for driving centrifugal pump 20. An annular shield 24, suitably of steel, is fixedly secured between end plate 26 and housing 28 of the pump motor to circumferentially shroud the rotating flywheel thereby inhibiting external contamination of the motor interior while protecting against the projection of centrifugally thrown components from the flywheel. Typically, the span between shield 24 and flywheel 10 is small, e.g., suitably 2 in. for a 35 in. radius flywheel, to assure interception of segments fractured from the flywheel before the segments acquire sufficient force to penetrate the shield.

In accordance with this invention, flywheel 10 is formed of three annular discs 30, 32 and 34 of identical geometric configuration individually mounted upon shaft 12 by any conventional technique, such as shrinking the heated discs atop the shaft. Although a single key 36 desirably is inserted between the discs and the shaft, the discs otherwise are disconnected from each other. Thus, should any one disc fracture, for example disc 32 along fracture line 38, the fractured segment would be free to be thrown from the flywheel by the centrifugal forces acting thereon without interference (other than frictional) from adjacently positioned discs 30 and 34. The dislodged segment then tends to inhibit continued rotary motion of the pump motor by welding to the interior surface of shield 24 and jamming between the periphery of flywheel 10 and the interior of the shield. Thus, if conventional vibration sensors (not shown) disposed along the housing of the motor did not de-energize the motor automatically upon the throwing of the fractured segment, the additional current drawn by the locked rotor would disengage the motor circuit breakers (not shown) to interrupt the A.C. power applied to stator windings 18 and shut down the motor.

To inhibit simultaneous fracturing of the discs forming flywheel 10, one disc, for example disc 32, is fabricated of a material having a tensile strength significantly lower than the tensile strength of the adjacent discs, e.g., by choosing steels having different carbon contents for each disc. For example, disc 32 typically may have tensile strength of 50,000 lbs./sq. in. while adjacent discs 30 and 34 may be formed of a material having a substantially higher tensile strength, for example 70,000 lbs./sq.in. Thus, in a runaway condition, disc 32 would initially fracture and, because the fractured disc forms only a portion of the total weight of the flywheel, the fragmented segment can be easily intercepted by shield 24 without penetration therethrough. A shield of substantially smaller thickness therefore can be employed for fail-safe operation relative to the shield thickness required to assure against penetration by a flywheel of identical size formed as a unitary structure. For example, a 70 in. diameter cylindrical steel flywheel having a thickness of 11 in. and rotating at 1,440 rpm has a kinetic energy in excess of $17.5 \times 10^{-6}$ foot lbs. requiring an annular steel shield approximately 18 in. thick to confine a 120° pie shaped segment fractured from the unitary flywheel at a velocity of 252 ft./sec. However, by designing the flywheel as three juxtaposed annular discs, the thickness of the shield required to inhibit penetration of a 120° pie shaped segment from one disc travelling at the identical velocity can be reduced to approximately 3 in., i.e., six fold reduction in shield thickness for a laminar flywheel of similar configuration.

In general, it is desirable that the juxtaposed discs forming the flywheel be of sufficient thickness to jam the motor when wedged in the span between the flywheel and the shield. To achieve this result, the number of annular discs forming the composite flywheel preferably should be small, i.e., typically less than 6, with three annular discs having a tensile strenght differing by at least 10,000 lbs./sq. in. having been found optimum for fabrication of a laminar flywheel structure. By positioning the disc having the lowest tensile strength at the center of the flywheel, the adjacent discs, e.g., discs 30 and 34, serve as shields to block the initially fractured disc segment from travelling in an axial direction. Thus, the thickness of end plate 26 can be reduced relative to shield 24 with annular disc 30 disposed between the end plate and the lowest tensile strength disc serving as a shield for the end plate.

Figure 2:
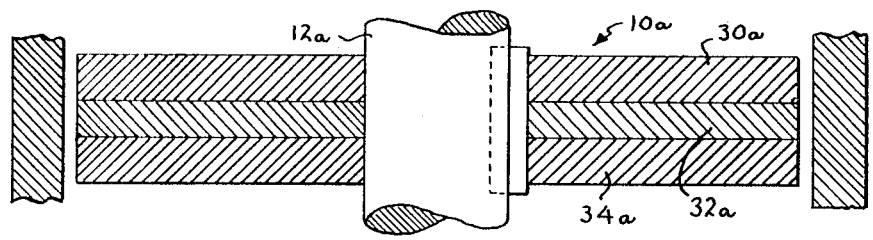
FIG. 2 is a sectional view of an alternate flywheel construction in accordance with this invention wherein the juxtaposed discs forming the flywheel are of different tensile strength and thicknesses.

While the juxtaposed discs forming the laminar flywheel are illustrated in FIG. 1 as having identical geometrical configurations, controlled fracturing of the flywheel preferably is achieved by forming the flywheel of annular discs of diverse thicknesses as illustrated by flywheel 10a of FIG. 2 wherein end discs 30a and 34a are of greater thickness and tensile strength than interior disc 32a. Disc 32a therefore will fracture prior to the fracturing of adjacent discs 30a or 34a thereby assuring an initial fracturing of only a small fraction of the total flywheel. Because the discs are disconnected other than being mounted upon shaft 12a, the fractured segment of disc 32a can be thrown outwardly from the rotating shaft to wedge between the flywheel and the shield thereby providing fail-safe stopping of the motor. In general, disc 32a should be at least 10 percent thinner than the remaining discs forming the flywheel to significantly affect the size and kinetic energy of a fractured segment relative to a segment produced by a flywheel of identical mass formed of geometrically identical juxtaposed discs.

Figure 3:
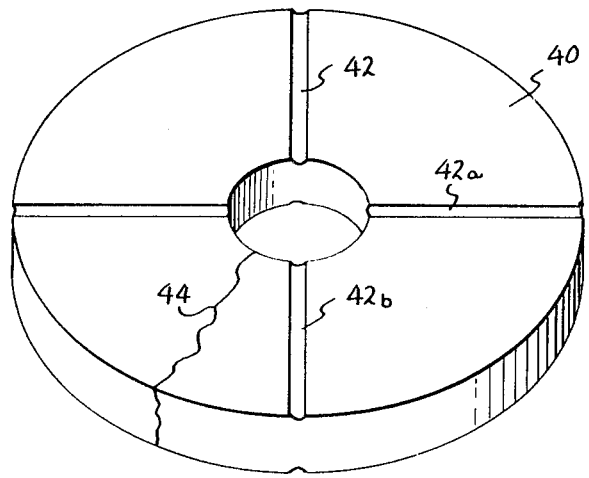
FIG. 3 is an isometric illustration of a unitary flywheel having radial grooves therein to assure fracturing in a pre-determined configuration.

An alternate embodiment of this invention is illustrated in FIG. 3 wherein cylindrical flywheel 40 is formed as a unitary structure having radially extending grooves 42 along at least one circular surface to assure rotary fracturing of the flywheel in a configuration other than a 120° pie-shaped wedge, i.e., a geometrical configuration observed empirically to represent the most dangerous fragments released upon rotary disintegration of a flywheel. While the flywheel illustrated in FIG. 3 could possibly fracture into two equal halves because of the 90° span between adjacent grooves 42 in the illustrated embodiment, the self-interference produced in the flight path of a 180° segment has been found to reduce the total force of the segment to an amount less than the force possessed by a 120° pie-shaped segment. Thus, the shield thickness required to confine a 180° segment is significantly less than the shield thickness required to assure total confinement of a flywheel not having pre-determined failure locations therein, i.e., a flywheel capable of fracturing into 120° segments. To inhibit possible fracturing of the flywheel into 120° segment, adjacent grooves of the flywheel should subtend an angle which is an uneven multiple of 120° when all grooves are equally spaced. When unequal angles are subtended by radial grooves 42, the total angle between any two grooves should be other than 120°. In general, the depth of grooves 42 will vary depending upon the ductility and tensile strength of the material forming for the flywheel. The grooves, however, should be as shallow as possible while providing sufficient tolerance to assure failure of the flywheel along the grooves, for example, along grooves 42a and 42b prior to failure along ungrooved line 44.

Figure 4:
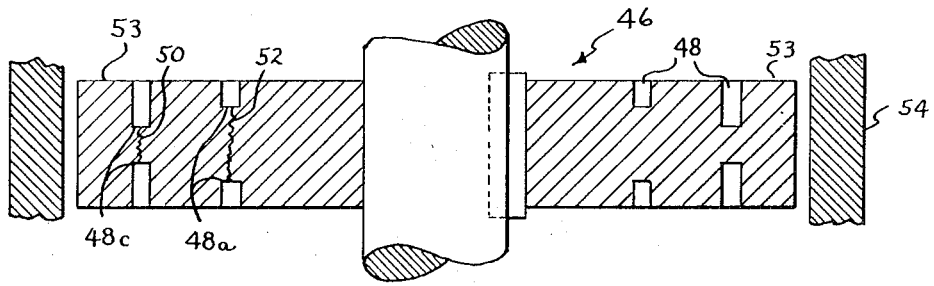
FIG. 4 is a sectional view of a flywheel wherein the failure locations are pre-determined by concentric grooves formed within the circular surface of the flywheel.

Pre-determined fracture locations along the flywheel also can be achieved by notching the circular surface of the flywheel with grooves disposed concentrically about the rotary axis as illustrated in flywheel 46 of FIG. 4. To produce fracturing of the segments from the flywheel in a sequence inversely proportional to the span from the flywheel axis notwithstanding with parabolic distribution of forces in the flywheel during rotation, grooves 48 should exhibit a severity, illustrated in FIG. 4, by a difference in the depths of the grooves, varying proportionally with the span of the grooves from the flywheel axis. For example, grooves 48 positioned most adjacent the circumference of the flywheel have a depth significantly greater than the depth of grooves 48a positioned more proximate the flywheel axis to assure fracturing along line 50 prior to fracturing along line 52.

Fail-safe operation of flywheel 46 also can be achieved by positioning the outermost groove 48 sufficiently close to the circumference of flywheel 46 to produce a radial fracturing (not shown) of annular areas 53 rather than a fracturing along line 50. Upon radial fracturing of the annular areas, the segments produced by the fracturing will no longer be able to independently withstand the centrifugal forces acting thereon and the segments will fan out in cantilever fashion from the flywheel to rub against closely positioned shield 54. The segments then tend to be frictionally welded to the shield thereby overloading the motor sufficiently to disengage the circuit breakers protecting the stator windings.

In general, the direction of the fissure produced upon fracturing of flywheel 46 is dependent upon such factors as the depth and geometric configuration of the grooves as well as span between the outermost groove and the flywheel periphery. When the circumferential grooves are spaced more than approximately 20 percent of the flywheel radius from the flywheel periphery, axially extending fissures, as illustrated by fracture line 50 in FIG. 4, tend to be produced. However, by situating the outermost groove very proximate the flywheel circumference, radially extending fissures tend to be produced and fail-safe operation is imparted to the flywheel by the cantilevered segments formed by the radially extending fissures without a complete fracturing of the segments from the flywheel.

Figure 5:
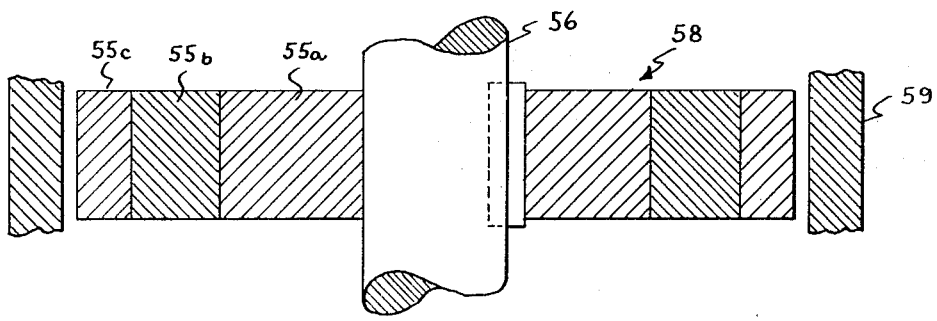
FIG. 5 is a sectional view of a flywheel in accordance with this invention formed from a plurality of concentric rings.

Controlled disintegration of a flywheel also can be achieved by the formation of the flywheel as a plurality of concentric rings, as shown in FIG. 5, wherein ring 55a is initially shrunk upon shaft 56 whereupon the outer rings, i.e., rings 55b and 55c, are sequentially shrunk thereon in identical fashion to form composite flywheel 58. Desirably, the thickness of each concentric ring decreases with increased span from the rotational center of the flywheel with ring 55a mounted upon shaft 56 being the thickest ring forming the flywheel while circumferential ring 55c is the thinnest ring forming the flywheel. The thickness of ring 55c, however, should be at least equal to the span between flywheel 58 and shield 59 to permit physical jamming of the motor upon fracturing of the outermost ring. Because flywheel 58 provides a completely smooth exterior, any noise produced by notching of the flywheel surface is eliminated.

What I claim as new and desire to cover by Letters Patent of the United States is:

1. In a rotary machine characterized by a rotatable shaft driven by a primary energy source for providing torque to a pre-determined load, a flywheel fixedly secured along the length of said shaft to provide inertia for said shaft to continue the application of torque to said load upon interruption of said primary energy source driving said shaft and a housing disposed about said flywheel, the improvement comprising a flywheel formed of a plurality of juxtaposed planar discs, at least one of said discs being of a material having a tensile strength lower than a second disc forming said flywheel to assure fracturing of said lower tensile strength disc before fracturing of said higher tensile strength disc during a runaway condition, said lower tensile strength disc being disconnected from said higher tensile strength disc to permit a fractured segment from said lower tensile strength disc to be thrown from the flywheel by the centrifugal force acting thereon.

2. A rotary machine according to claim 1 wherein said lower tensile strength disc is positioned intermediate discs having a higher tensile strength.

3. A fail-safe rotary drive system comprising a load, a primary source of energy, a rotary shaft coupled to said load to apply torque to said load upon rotation of said shaft by said primary energy source, a flywheel circumferentially secured to said shaft to provide sufficient inertia to said shaft to continue the application of torque to said load upon disengagement of said primary energy source as a propulsion source for said shaft, said flywheel having grooves extending radially from the inner circumference of said flywheel to the outer circumference of said flywheel to provide pre-determined failure locations along said flywheel, the total angle between any two said grooves being other than 120° to assure fracturing of said flywheel along said grooves into segments being characterized by a geometric configuration other than a 120° pie shaped segment of said total flywheel and a shield shrouding said flywheel to intercept any segments formed upon a fracture of said flywheel.

4. A fail-safe rotary drive system according to claim 3 wherein said radially extending grooves divide said flywheel into four quadrants.

5. A fail-safe rotating machine comprising a rotatable shaft having a flywheel fixedly positioned along the length of said shaft to rotate therewith, said rotation of said shaft exerting a centrifugal force upon said flywheel tending to fracture said flywheel from said shaft, said flywheel having circumferential grooves notched into the surface of said flywheel, said grooves exhibiting an increasing severity with increases span of the grooves from the flywheel axis, and a shield shrouding said rotary shaft to intercept any segment fractured from said flywheel.

6. A fail-safe rotating machine according to claim 5 wherein the difference in the severity of said circumferential grooves is obtained by notching said radially remote grooves to a depth greater than the depth of said radially interior grooves.

7. A fail-safe rotary machine comprising a load, a primary source of energy, a rotary shaft coupled to said load to apply torque to said load upon rotation of said shaft by said primary energy source, a flywheel circumferentially secured to said shaft to provide sufficient inertia to said shaft to continue the application of torque to said load upon disengagement of said primary energy source as a propulsion source for said shaft, said flywheel being formed of at least two concentric rings, said rings having a radial thickness which decreases with increased radial span of the rings from the center of said flywheel to assure fracturing of the outer ring of said flywheel prior to fracturing of the inner ring of said flywheel, said outer ring being further characterized by a radial thickness sufficient to permit physical jamming of said machine upon fracturing of said outer ring and a shield shrouding said flywheel to intercept any segments formed upon fracturing of said flywheel.

* * * * *